US010038601B1

(12) United States Patent
Becker et al.

(10) Patent No.: US 10,038,601 B1
(45) Date of Patent: Jul. 31, 2018

(54) MONITORING A MULTI-TIER NETWORK FABRIC

(71) Applicant: Amazon Technologies, Inc., Seattle, WA (US)

(72) Inventors: David Dale Becker, Seattle, WA (US); Eoin Francis Cavanagh, Dublin (IE)

(73) Assignee: Amazon Technologies, Inc., Seattle, WA (US)

( * ) Notice: Subject to any disclaimer, the term of this patent is extended or adjusted under 35 U.S.C. 154(b) by 274 days.

(21) Appl. No.: 14/498,028

(22) Filed: Sep. 26, 2014

(51) Int. Cl.
*G06F 15/173* (2006.01)
*H04L 12/24* (2006.01)
*H04L 12/26* (2006.01)
*H04L 12/707* (2013.01)
*H04L 29/12* (2006.01)

(52) U.S. Cl.
CPC .......... *H04L 41/28* (2013.01); *H04L 43/062* (2013.01); *H04L 43/12* (2013.01); *H04L 45/24* (2013.01); *H04L 61/2007* (2013.01)

(58) Field of Classification Search
None
See application file for complete search history.

(56) References Cited

U.S. PATENT DOCUMENTS

| | | | | |
|---|---|---|---|---|
| 6,363,056 B1* | 3/2002 | Beigi | ........................ | H04L 41/12 370/252 |
| 7,760,735 B1* | 7/2010 | Chen | ........................ | H04L 41/12 370/245 |
| 7,898,955 B1* | 3/2011 | Wang | ........................ | H04L 43/16 370/235 |
| 8,098,677 B1* | 1/2012 | Pleshek | ........................ | H04L 43/12 370/351 |
| 2002/0165957 A1* | 11/2002 | Devoe | ........................ | H04L 12/2697 709/224 |
| 2003/0141093 A1* | 7/2003 | Tirosh | ........................ | H04L 45/00 174/72 A |
| 2005/0169193 A1* | 8/2005 | Black | ........................ | H04L 12/462 370/254 |
| 2006/0215577 A1* | 9/2006 | Guichard | ........................ | H04L 12/2697 370/254 |
| 2006/0239199 A1* | 10/2006 | Blair | ........................ | H04L 45/04 370/248 |
| 2006/0294215 A1* | 12/2006 | Noble | ........................ | H04L 67/12 709/223 |
| 2007/0268882 A1* | 11/2007 | Breslau | ........................ | H04L 43/026 370/346 |

(Continued)

*Primary Examiner* — Phyllis A Book
(74) *Attorney, Agent, or Firm* — Klarquist Sparkman, LLP

(57) ABSTRACT

The following description is directed to monitoring a multi-tier network including a first tier of routers and a second tier of routers. In one embodiment, a method of monitoring the network comprises creating a probe packet. The probe packet can include a source address corresponding to a monitoring function, and a destination address served by a path from the first tier to the second tier of routers. The probe packet can be transmitted into the multi-tier network. A number of probe packets counted by each router of the first and second tiers of routers can be received. One or more performance metrics of the multi-tier network can be determined based, at least in part, on a sum of the number of probe packets counted by the first tier of routers and a sum of the number of probe packets counted by the second tier of routers.

20 Claims, 6 Drawing Sheets

(56) References Cited

U.S. PATENT DOCUMENTS

| | | | | |
|---|---|---|---|---|
| 2008/0008178 A1* | 1/2008 | Tychon | ................... | H04L 45/12 370/392 |
| 2010/0188971 A1* | 7/2010 | Chiang | ............... | H04L 12/2834 370/225 |
| 2010/0254397 A1* | 10/2010 | Nishi | ...................... | H04L 41/12 370/401 |
| 2011/0176429 A1* | 7/2011 | Johnsson | ............ | H04L 12/2697 370/241 |
| 2013/0058235 A1* | 3/2013 | Johnsson | ................ | H04L 43/50 370/252 |
| 2014/0269380 A1* | 9/2014 | Rusak | ................ | H04L 43/0811 370/252 |
| 2014/0325649 A1* | 10/2014 | Zhang | ................... | H04L 43/024 726/23 |
| 2015/0188780 A1* | 7/2015 | Spieser | ............... | H04L 41/5009 370/252 |
| 2015/0244617 A1* | 8/2015 | Nakil | ................. | G06F 9/45558 709/224 |

* cited by examiner

MONITORING A MULTI-TIER NETWORK FABRIC

BACKGROUND

Computer networks generally comprise various interconnected computing devices that can communicate with each other via packets to exchange data. When small numbers of devices are interconnected, the devices can be directly connected to each other. For example, one device can be directly connected to another device via a network link and the devices can communicate by sending packets to one another over the network link. However, direct connections between large numbers of devices is not scalable. Thus, the connections between large numbers of devices will typically be via indirect connections. For example, one device can be connected to another device via an interconnection network comprising one or more routers.

Large routers for connecting many devices together can be expensive. However, large routers can be constructed from lower cost commodity equipment interconnected as a network fabric. A network fabric can include multiple nodes interconnected by multiple network links. A node can include a networking device that can originate, transmit, receive, forward, and/or consume information within the network. For example, a node can be a router, a switch, a bridge, an endpoint, or a host computer. The network fabric can be architected or organized as a topology of the nodes and links of the communication system. For example, the network fabric can be organized as a multi-tier network fabric such that a packet traversing the network fabric passes through multiple intermediary nodes associated with the different tiers of the multi-tier network.

An operator of a network fabric may desire to provide high availability and throughput through the network fabric. Thus, the operator may monitor the components of the network fabric for indications of dropped or lost packets, service degradation, component failures, or congestion within the network fabric. However, as the number of nodes and links of the network fabric increases, it can be more difficult to detect and isolate degraded components within the network fabric.

DETAILED DESCRIPTION

Figure 1:
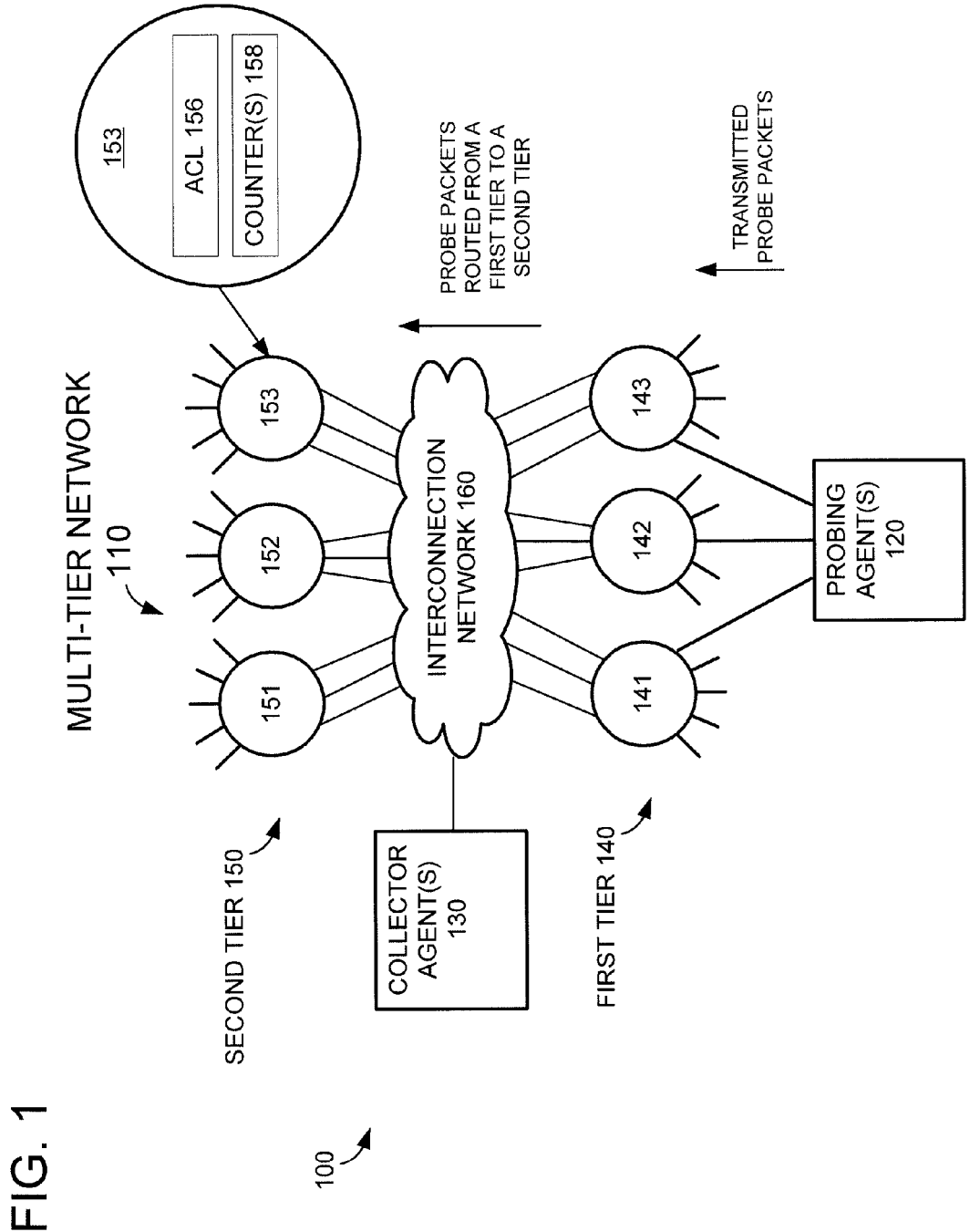
FIGS. 1-2 are example system diagrams showing systems for routing network traffic including a multi-tier interconnection network.

A multi-tier network fabric can comprise multiple stages or tiers, where each tier includes multiple routers. For example, a multi-tier network fabric can comprise three, seven, thirteen, or more tiers of routers. The multi-tier network can comprise one or more tiers at the "edge" of the fabric and one or more "core" tiers that are internal to the network. A router of a core tier (e.g., a core router) can be connected to routers of one or more different tiers of the network. A router of an edge tier (e.g., an edge router) can include one or more "externally facing ports" for connecting to and between devices outside of the multi-tier architecture. For example, the edge tier can be at the enterprise border. The edge router can also connect to core routers so that network traffic can be transmitted from one edge, through the core, and out the same or another edge.

For example, a multi-tier Clos network can include an ingress edge tier, a core tier, and an egress edge tier. Each router of the edge tiers can include externally facing ports for receiving and/or transmitting packets from/to outside the Clos network and each edge router can be connected to one or more routers of the core tier. Each edge router can be connected to all of the routers of the core tier. Packets can be communicated from the ingress edge tier, through the core tier, and out the egress edge tier in three hops, where a hop occurs each time a packet passes through a router. In this manner, each device connected to an externally facing port can connect to any other device on an externally facing port of the multi-tier network. Exemplary multi-tier architectures include Clos, folded-Clos, fat-tree, butterfly, flattened-butterfly, and dragonfly networks.

As the number of tiers, routers, and links grow in the multi-tier network, it can be more complicated to triangulate where degraded components of the multi-tier network are located. A degraded or failed node can sometimes report that it is degraded or has failed, but there can be failure modes where the failed node cannot report its status. External agents can be used to triangulate degraded components. In one solution for monitoring the multi-tier network, the network is treated like a black box and agents located at the edge of the network send health probes (e.g., packets) through the network to each other. For example, one agent can send a health probe to a second agent and the second agent can respond to the first agent. If the health probes are dropped, or have a greater than expected hop-count or latency, then a component within the network may be degraded. However, an exemplary multi-tier network can have hundreds of thousands of links and five to thirteen hops between agents and so it can be complicated to determine exactly which node or link is problematic in the network.

As described herein, health probes can be transmitted through the multi-tier network and the nodes of the network can be queried to determine statistics for each tier, node, and/or link of the network to assess the health of the components of the network. Performance metrics can be determined using the statistics and knowledge of the architecture of the multi-tier network. For example, the multi-tier network can be architected so that each tier forwards the same number of packets as every other tier in the multi-tier network. Probe packets can be sent through the network fabric and the packets can be counted at each node in the network. The packet counts for all of the nodes of a tier can be summed, and if the packets counted at the tier match the number of packets injected into the network fabric, then it can be determined that the tier is healthy (e.g., not degraded). If the packets counted at a tier are less than the number of packets injected into the network fabric, then the counts at each node can be further examined to determine which nodes of the tier are unhealthy. As another example, probe packets can be sent through a selected portion of the network fabric, and the packets can be counted at the subset of nodes associated with the selected portion of the network fabric. The packet counts for the nodes-under-test of a tier can be summed, and if the packets counted at the tier match the number of packets injected into the subset of the network fabric, then it can be determined that the tier is healthy. If the packets counted at a tier are less than the number of packets injected into the subset of the network fabric, then the counts at each node-under-test can be further examined to determine which of the selected nodes of the tier are unhealthy.

FIG. 1 illustrates an example system diagram showing a system 100 for routing network traffic. The system 100 includes a multi-tier network 110, a probing agent 120, and a collector agent 130. The multi-tier network 110 can be configured to transmit packets using one or more communications protocols. Routing through the multi-tier network 110 can be based on addresses associated with one or more layers of the Open Systems Interconnection (OSI) model. The OSI model standardizes and partitions the internal functions of a communication system into abstraction layers. For example, the multi-tier network 110 can be configured to communicate using User Datagram Protocol (UDP) packets (layer 4, the transport layer, of the OSI model) over Internet Protocol (IP) (layer 3, the network layer, of the OSI model) over Ethernet (layer 2, the data link layer, of the OSI model). In an alternative embodiment, the multi-tier network 110 can be configured to communicate with Infiniband, Fibre Channel, RapidIO, or another communications protocol.

The probing agent 120 can be configured to transmit probe packets into the multi-tier network 110. For example, the probing agent 120 can transmit probe packets into a first tier 140 of the multi-tier network 110. Specifically, the probing agent 120 can transmit probe packets to each router 141-143 of the first tier 140. In an alternate embodiment, the system 100 can include multiple probing agents 120. For example, a different probing agent 120 can be associated with each router of a tier of routers. The tier of routers can be an edge tier or a core tier of the multi-tier network 110. As one example, a first probing agent 120 can be connected to router 141, a second probing agent 120 can be connected to router 142, and a third probing agent 120 can be connected to router 143. The probing agent 120 can be an endpoint external to the multi-tier network 110 or the probing agent 120 can be integral with a node of the multi-tier network 110. For example, the probing agent 120 can be an agent executing on a host computer external to the multi-tier network 110 or the probing agent 120 can be an agent executing directly on a router of the multi-tier network 110.

It should be understood that the terms "switch" and "router" can be used interchangeably for network devices having multiple ports or interfaces. For purposes of clarity and explanation, this document standardizes on the term "router" to mean a multi-port network device that processes and forwards packets using header information from one or more layers of the OSI model. Generally, a packet can include a header and data, where the header is a data structure that is used by peers at the same OSI layer to communicate with each other. The format of the header is determined based on the specific networking protocol associated with the header. Thus, an Ethernet header can be different from an IP header, for example. Packets can be encapsulated within the data field of another packet at a lower layer. Thus, a Transmission Control Protocol (TCP) packet (layer 4, the transport layer, of the OSI model) can be encapsulated in the data field of an IP packet (layer 3) which can be encapsulated in the data field of an Ethernet packet (layer 2).

A probe packet can include fields for identifying the type of packet and for routing the packet. For example, the probe packet can be an IP packet including a source address and a destination address. The source address of an IP packet typically is used to identify the source of the node that created the packet. However, the probe packet can include a forged or false source address that is used to identify the packet as a probe packet rather than identifying the node that originated the packet. In other words, the probe packet can overload the source address field with an identifier corresponding to a probing function. Thus, the probe packet can be distinguished from other packets transiting the multi-tier network 110 by merely analyzing the value of the source address field. The probe packet identifier can be selected from one or more reserved addresses. For example, a predetermined range of addresses can be reserved to correspond to one or more probing functions. As one example, a single source address can be used for each probing agent 120 of the system 100, when multiple probing agents are used. As another example, one source address can be used for probe packets sent in a first direction (such as from the first tier to the second tier) and a second source address can be used for probe packets sent in a second direction (such as from the second tier to the first tier). As yet another example, different source addresses can be used to identify different paths or portions of paths through the multi-tier network 110. As yet another example (and described in more detail with relation to FIG. 4), different source addresses can be used to identify different periods of time, corresponding to when the probe packets are transmitted.

The destination address can be used to forward or route the probe packet through the multi-tier network 110. The destination address of an IP packet typically identifies the ultimate consumer of the packet. However, the probe packet can be a unilateral, unidirectional packet without an ultimate consumer. In other words, the probe packet can traverse the network fabric and then get dropped prior to reaching an endpoint. Each router of the multi-tier network 110 can include a forwarding table with mappings between addresses and the next nodes along the path to the address. The probe packet can be forwarded based on a comparison of the destination address to the entries in the forwarding table. Thus, the destination address can be selected to correspond to a path through the multi-tier network 110. In other words, the destination address can be selected so that an intermediate path between the source of the packet and the destination of the packet passes through one or more nodes and/or links of the multi-tier network 110. For example, the destination address can be served by a path from the first tier of routers 140 to the second tier of routers 150. Multiple probe packets can be transmitted from agent 120 to test multiple paths through the multi-tier network 110 that span the address space reachable by the multi-tier network 110.

The destination address can be selected from real network addresses associated with a router. For example, router 151 may receive network traffic from a host device having an IP address of 128.96.36.126. The real network addresses of 128.96.36.126 can be used for the destination address of a probe packet transmitted from probing agent 120 to router 142 to test the path from router 142 to router 151. As described in more detail below, the probe packet can be dropped at router 151 (through selection of a TTL value or by programming an ACL rule at router 151) before it is sent to the host device having IP address 128.96.36.126.

The destination address can be selected from unused addresses associated with a router. For example, router 151 can be connected to hosts using IP addresses with the prefixes 128.96.128.0/24, 128.96.129.0/24, and 128.96.131.0/24, leaving the address range 128.96.130.0/24 unused (e.g., a black-hole address range). An unused address within 128.96.130.0/24 can be used for the destination address of a probe packet transmitted to router 142 to test the path from router 142 to router 151. It should be understood that "128.96.128.0/24" is Classless Inter-Domain Routing (CIDR) notation referring to a range or subnet of IP addresses with a routing prefix of 24 address bits, so that addresses between 128.96.128.0 and 128.96.128.255 are within the subnet.

The destination address can be the address of an actual network destination outside of the multi-tier network 110 and the device at the destination can be programmed to filter the probe packet. For example, a destination device running linux can be programmed with an iptables rule to drop the probe packets based on the source address of the probe packet.

The probe packet can also include a time-to-live (TTL) field or a hop-count field. For example, the probe packet can be an IP packet including a TTL field. The TTL field value is typically decremented at each hop of an IP network. Thus, the TTL field value can be decremented as the probe packet passes through each router of the multi-tier network 110. By setting the TTL field value small enough, the probe packet can be dropped before reaching the destination corresponding to the destination address. For example, if the probing agent 120 sets the TTL field value to one less than the number of tiers of the multi-tier network 110, the probe packet can traverse all tiers of the multi-tier network 110 and get dropped at the last tier of the multi-tier network 110. Thus, an actual network destination outside of the multi-tier network 110 can be used for the probe packet, but the TTL field value can be set so that the probe packet is dropped before the packet is sent to the actual network destination. Summarizing, the TTL field value can be set so the packet is dropped at a core tier of the multi-tier network 110 (such as when only a portion of the tiers are to be tested); the TTL field value can be set so the packet is dropped at an edge opposite of the edge it is injected at (such as when all tiers are to be tested); or the TTL field can be set so the packet is dropped beyond the multi-tier network 110, but before the packet reaches the destination address provided in the packet. For protocols other than IP, a hop-count that increments at each node can provide a function similar to the TTL field. For example, the hop-count can be set to a maximum hop-count minus the number of tiers of the multi-tier network 110, so that the probe packet can be dropped at the edge of the multi-tier network 110.

The multi-tier network 110 can include multiple tiers of routers, such as the first tier 140 and the second tier 150. The first and second tiers 140, 150 can be interconnected by an interconnection network 160 so that the routers 141-143 of the first tier 140 and the routers 151-153 of the second tier 150 can communicate with each other. The interconnection network 160 can include network links and one or more additional tiers of routers or only network links. In one embodiment, the interconnection network 160 includes network links connecting each router of the first tier 140 to every router of the second tier 150 and each router of the second tier 150 to every router of the first tier 140. For example, the router 141 can have direct network links to the routers 151-153. The interconnection network 160 can exclude direct network links between routers of a given tier. For example, when there are no direct network links between routers of a given tier, then routers 141 and 142 can communicate by sending one or more packets through an intermediary node, such as router 152.

Each router of the multi-tier network 110 can include logic for forwarding or routing a received packet. For example, the router can include a forwarding table with mappings between addresses and one or more nodes along the path to the address. For example, the router can map an address to a next-hop along a path to the address. The mappings can be predefined and programmed by a network administrator (e.g., a static route), or learned dynamically via a routing protocol such as Address Resolution Protocol (ARP), Open Shortest Path First (OSPF), or Border Gateway Protocol (BGP). A packet can be forwarded based on a comparison of a portion of the destination address of the packet to the entries in the forwarding table.

Each router of the multi-tier network 110 can include logic for balancing network traffic across multiple network links to potentially reduce congestion on any one network link. For example, each router can forward packets based on an equal cost multipath (ECMP) routing algorithm. The ECMP algorithm can hash on fields associated with one or more OSI layers of the probe packet header to determine which network link can transmit the probe packet. For example, the ECMP hash function can use the source address, destination address, source port, and destination port fields of the TCP and the IP layers. Thus, for a given source and destination address, a probe packet can be routed across different intermediate paths by varying the source port and/or the destination port of the probe packet.

Each router of the multi-tier network 110 can include an access control list (ACL) 156 and one or more counters 158. The ACL 156 is a set of rules that can be used to filter and/or profile network traffic. Each rule can specify a set of conditions that a packet must satisfy to match the rule. For example, the set of conditions can include fields of the packet match a specific value or be within a predefined range of values. For example, a rule can be configured to match on a source address of the packet that is within a predetermined range, such as the range used to identify the packet as a probe packet with a corresponding probing function. When the router determines that an ACL rule applies to a packet, it can permit or deny the packet. Specifically, if the packet matches the ACL rule, the packet can be forwarded or dropped, depending on how the ACL 156 is defined. ACL rules can be based on one or more of a source address, a destination address, an ingress port, and an egress port of the router, for example. One or more counters 158 can be associated with the ACL 156. For example, a first counter can be triggered on a first ACL rule being matched, and a different counter can be triggered on a different ACL rule being matched.

Each router of the multi-tier network 110 can include memory for storing the ACL 156, such as a content addressable memory (CAM) or a ternary content addressable memory (TCAM). A CAM and/or a TCAM may potentially increase the speed for determining if there is a match for an ACL rule as compared to storing the ACL rules in a random access memory (RAM). When the ACL rules are stored in only a RAM, a search for an ACL rule matching one or more fields of the packet can take potentially many accesses to the RAM. This is because RAMs are accessed by providing an address for the RAM in order to receive the data (e.g., the ACL rule) stored at the address. However, a CAM can search the entire memory in one operation because data is used to access the storage location of the data. Thus, the data from one or more fields of the packet can be used as a key to access the CAM to determine if there is an ACL rule corresponding to the packet fields. For example, the source address of the packet can be used to access the CAM and to determine if an ACL rule corresponds to the source address. A CAM requires an exact match of the data being searched, but a TCAM allows portions of the data fields to be masked.

Thus, the TCAM can potentially increase the speed of searching for longest matches among several potential matches. Use of a TCAM for storing the ACL 156 can potentially reduce the impact of injecting probe packets into the flow of traffic through the multi-tier network 110 because actions associated with the probe packets can be performed efficiently at the individual routers of the multi-tier network 110.

The ACL 156 and the one or more counters 158 can be used to filter and profile the probe packets traversing the multi-tier network 110. As an example, 900 probe packets can be transmitted from the probing agent 120 into the multi-tier network 110. The probing agent 120 can spread the probe packets across the first tier 140 by transmitting 300 probe packets to each of the routers 141-143, respectively. The received probe packets can be counted by the routers 141-143, by matching the source addresses of the probe packets to one or more ACL rules programmed on the routers 141-143. For example, a single source address can be used for all of the probe packets and one ACL rule can be used to match the source address. Alternatively, multiple source addresses can be used for the probe packets, such as by using a first source address for packets transmitted to router 141, a second source address for packets transmitted to router 142, and a third source address for packets transmitted to router 143. Three different ACL rules can be used to match the source address corresponding to each respective router 141-143. Regardless of the number of ACL rules used to match the probe packets, the total number of packets counted as being received at the first tier 140 will be the same number of packets as transmitted from probing agent 120, e.g., 900 probe packets, when the network links between the probing agent 120 and the first tier 140 are healthy. In contrast, if less than 900 probe packets reach the first tier 140, then one or more network links between the probing agent 120 and the first tier 140 may be degraded.

The routers of the first tier 140 can then transmit the probe packets from the first tier 140 to the second tier 150 via the interconnection network 160. The probing agent 120 can address the probe packets so that the destination addresses for the probe packets are distributed across the address range of the second tier 150. For example, the probing agent 120 can address 300 of the probe packets to an address associated with router 151, 300 of the probe packets to an address associated with router 152, and 300 of the probe packets to an address associated with router 153. Thus, the probe packets can be distributed across the different paths of the multi-tier network 110 to test substantially all of the components of the multi-tier network 110. When the probe packets are received by the routers of the second tier 150, one or more ACL rules can be used to count the received probe packets. Further, the ACL rules can be programmed to drop the received probe packets, such as when the second tier 150 is an edge of the multi-tier network 110, so that the probe packets do not get transmitted outside of the multi-tier network 110. If the multi-tier network 110 is healthy, 900 packets will be received by the routers of the second tier 150.

One or more collector agents 130 can be used to collect and gather statistics from the individual routers of the multi-tier network 110 and to determine the health of one or more components of the multi-tier network 110. The collector agent 130 can be connected to the multi-tier network 110 in various ways. As illustrated, the collector agent 130 can be connected to the routers of the first and second tiers 140, 150 via the interconnection network 160. For example, the interconnection network 160 can include a direct network link from the collector agent 130 to each of the routers of the first and second tiers 140, 150. The collector agent 130 may connect to each of the routers via a management interface of the routers. Alternatively, the collector agent 130 can communicate with each of the routers of the first and second tiers 140, 150 via indirect paths to the routers, such as when the collector agent 130 is connected to an edge of the multi-tier network.

Multiple collector agents 130 can be used to collect or gather statistics from the individual routers of the multi-tier network 110. For example, one collector agent 130 can be associated with one or more tiers of the multi-tier network 110, and a different collector agent 130 can be associated with one or more different tiers of the multi-tier network 110. Thus, the collector agent 130 functionality can be distributed across multiple collector agents 130 to potentially improve the scalability of monitoring the multi-tier network 110.

The collector agent 130 can receive a value of the one or more counters of each router of the first and second tiers 140, 150 of the multi-tier network 110. In one embodiment, the collector agent 130 can poll the routers periodically to gather the counter values. For example, the collector agent 130 can poll the routers every thirty seconds. The routers can be polled in various ways. For example, the collector agent 130 can acquire the counter values by Simple Network Management Protocol (SNMP) queries or by a custom application programming interface (API) request. In an alternative embodiment, the routers of the multi-tier network 110 can periodically transmit the counter values to the collector agent 130 at predefined times without a request from the collector agent 130.

The collector agent 130 can determine one or more performance metrics of the multi-tier network 110 based, at least in part, on aggregating the statistics collected from the routers of the multi-tier network 110. For example, the collector agent 130 can determine one or more performance metrics of the multi-tier network 110 based on a sum of the number of probe packets counted at the routers of the first tier of routers 140 and a sum of the number of probe packets counted at the routers of the second tier of routers 150. For example, the collector agent 130 can determine that packets are being dropped between the first tier of routers 140 and the second tier of routers 150 if the number of probe packets received at the second tier of routers 150 is less than the number of probe packets received at the first tier of routers 140. Thus, the first tier of routers 140 or the network links connecting the first and second tiers 140, 150 may be degraded if the number of probe packets received at the second tier of routers 150 is less than the number of probe packets received at the first tier of routers 140.

If a tier of routers is not receiving the expected number of probe packets, the collector agent 130 can potentially triangulate degraded components within a tier of routers or degraded links connecting the different tiers of routers. Triangulating degraded components can be enhanced as the number of ACL rules per router is increased. For example, an ACL rule can be set to match packets with a given source address that are received on a given ingress port. When an even distribution of packets is expected across the ingress ports of the tier, such as when the preceding tier is transmitting packets using ECMP, then ingress ports with counts less than expected may be degraded, connected to a degraded network link, or connected to a degraded router in the preceding tier. As another example, an ACL rule can be set to match packets with a given source address that are transmitted on a given egress port. When an even distribution of packets is expected across the egress ports of the tier, such as when the tier is transmitting packets using ECMP, then egress ports with counts less than expected may be degraded, connected to a degraded network link, or connected to a degraded router in the following tier. Using ACL rules for both ingress ports and egress ports can potentially further isolate a problematic component. For example, if the number of probe packets received by a router is different than the number of probe packets transmitted by a router, the router may be degraded or connected to a degraded router or network link.

Figure 2:
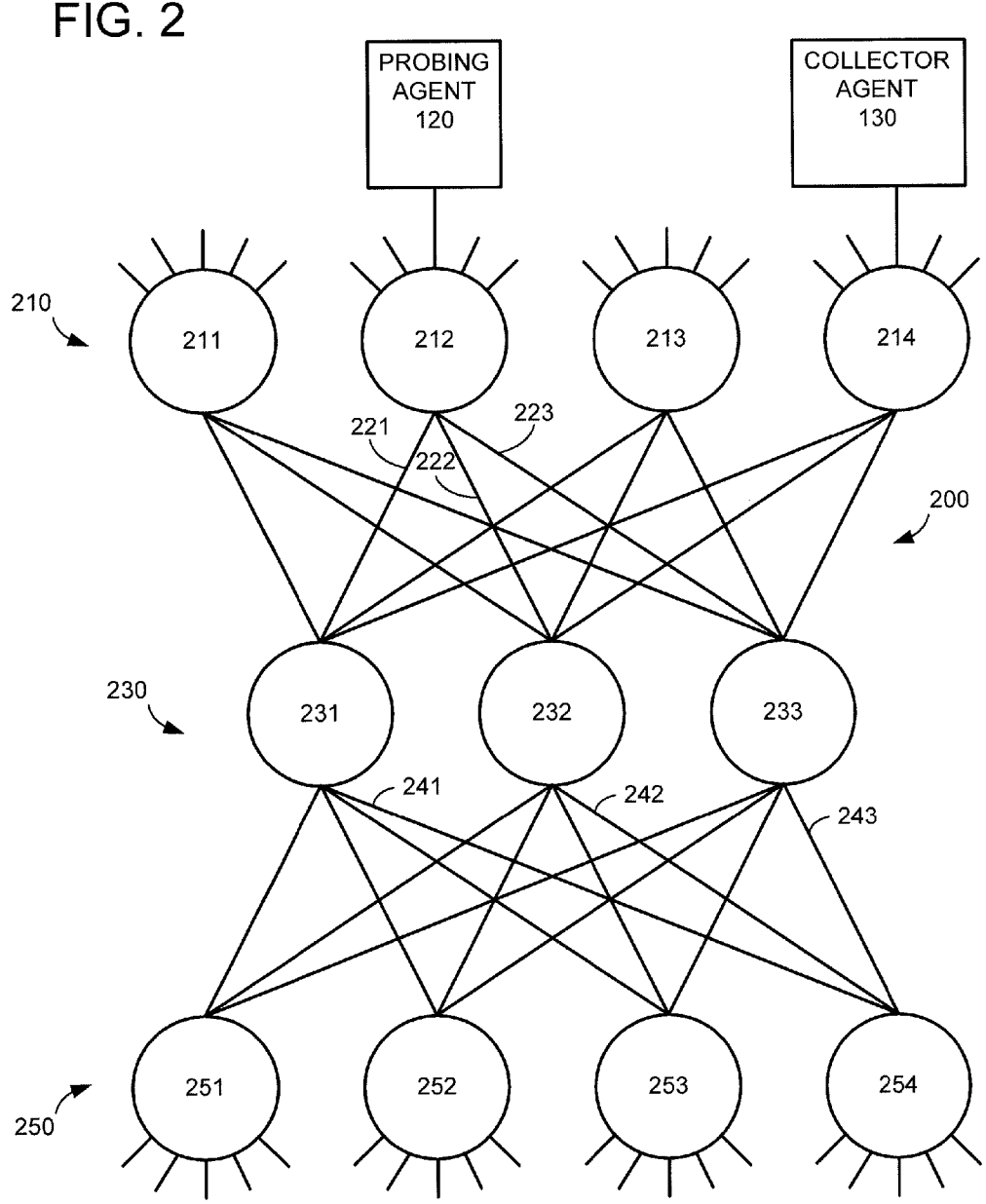

FIG. 2 illustrates an example system diagram showing a system for routing network traffic. The system includes a multi-tier network 200, a probing agent 120, and a collector agent 130. The probing agent 120 and the collector agent 130 are connected to respective routers of an edge of the multi-tier network 200. Specifically, probing agent 120 is connected to router 212 and the collector agent 130 is connected to router 214. In an alternate embodiment, the probing agent 120 and the collector agent 130 can be connected to the same router, such as when the probing agent 120 and the collector agent 130 are executing on the same host computer. The multi-tier network 200 includes a first edge tier 210, a core tier 230, and a second edge tier 250. Tier 210 includes routers 211-214, tier 230 includes routers 231-233, and tier 250 includes routers 251-254. Packets traversing the multi-tier network 200 can be forwarded using the ECMP algorithm, such that there are three equal cost paths from router 212 to router 254. The three equal cost paths include (1) router 212 to router 231 to router 254 via links 221 and 241, respectively; (2) router 212 to router 232 to router 254 via links 222 and 242, respectively; and (3) router 212 to router 233 to router 254 via links 223 and 243, respectively.

A group of probe packets can be generated by the probing agent 120 including a group of probe packets having a destination address associated with router 254. By sending enough probe packets with varying source ports, the packets can be distributed fairly evenly across the three equal cost paths. In other words, varying the source port can be used to distribute the group of probe packets across different intermediate paths of the multi-tier network 200. For example, the probing agent 120 can increment the source port for each probe packet sent to the router 254. Thus, if 1024 probe packets are sent from the probing agent 120 to the router 254, the source port can vary between 0 and 1023 so that the ECMP hashing function will spread the probe packets across the three equal cost paths. Thus, each of the routers 231-233 can receive about one-third of the packets transmitted from the first tier 210. In alternative embodiments, the destination port, both the source and destination ports, or other fields and combinations of fields mapping to the ECMP hashing function can be varied in order to spread probe packets across equal cost paths.

Each router of the multi-tier network 200 can include an ACL rule associated with a counter. For example, the counter can trigger on an ACL rule that matches on received packets having a source address associated with the probing function. If the probing agent 120 sends 1024 probing packets and the multi-tier network 200 is healthy, each of the tiers 210, 230, and 250 will receive 1024 probe packets. The collector agent 130 can query each of the routers to collect packet counts associated with the ACL rules. The collector agent 130 can aggregate the statistics for each tier. If the sum of the packet counts at a given tier is less than the sum of the packet counts at a preceding tier, then the packet counts at each router can be further analyzed to determine the potential degraded components of the multi-tier network 200.

Each router of the multi-tier network 200 can include a counter triggered on an ACL rule that matches on packets having a source address associated with the probing function. Each edge router of the multi-tier network 200 can include a counter triggered on an ACL rule that drops packets having a source address associated with the probing function. Thus, the number of probe packets transmitted by a tier can be compared to the number of probe packets received at the same or a neighboring tier. The number of probe packets transmitted by a tier can also be compared to the number of probe packets dropped at the edge tier.

Figure 3:
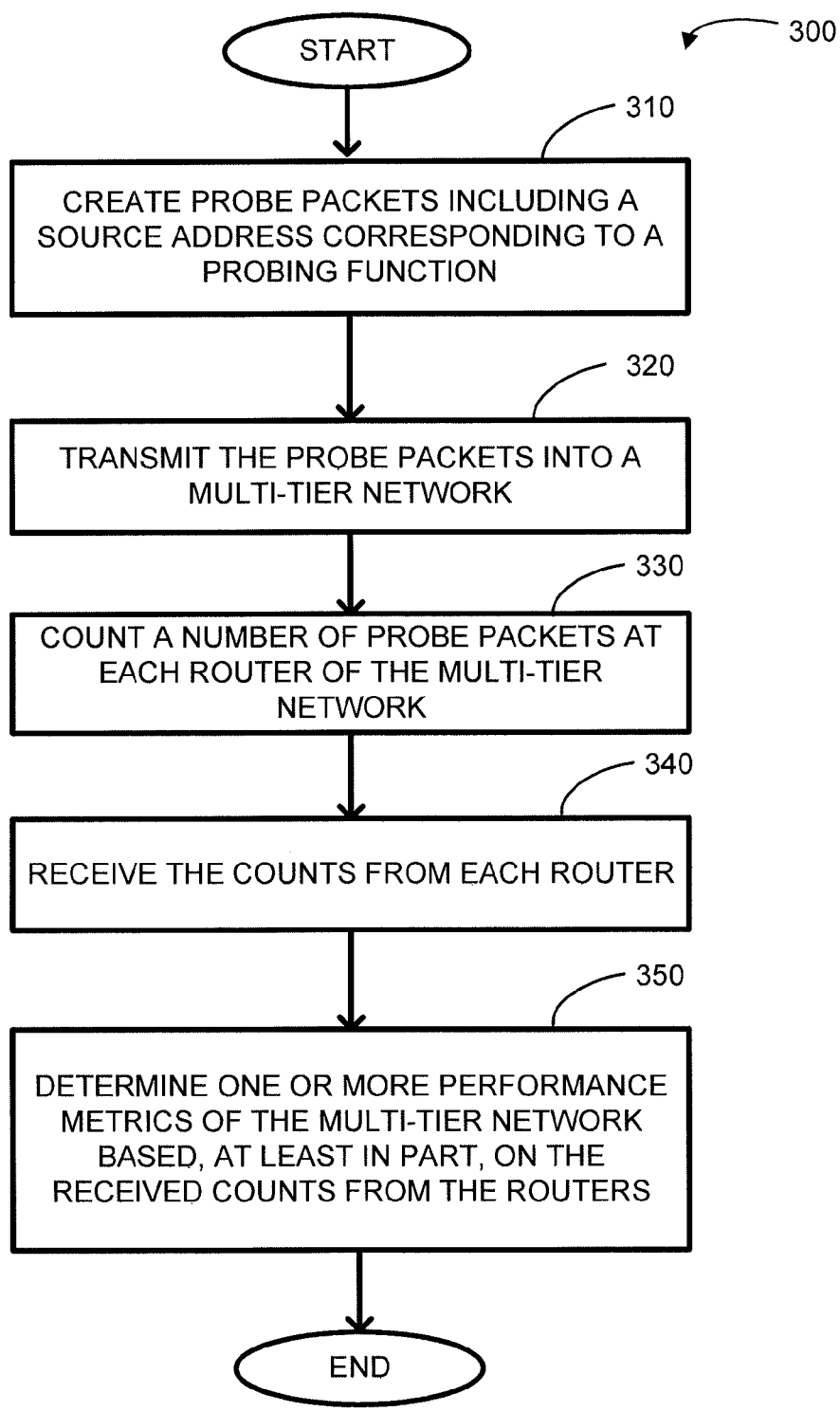
FIGS. 3-4 show flow diagrams of example methods for monitoring a multi-tier interconnection network.

FIG. 3 shows a flow diagram of an example method 300 for monitoring a multi-tier interconnection network, such as multi-tier networks 110 or 200. At 310, a group of probe packets including a source address corresponding to a probing or monitoring function can be created. The group of probe packets can include a predetermined number of probe packets. Factors affecting the number of probe packets can include the number of tiers in the multi-tier network, the number of devices per tier, the connectivity between the tiers, and the distribution and number of address ranges reachable at the edge of the multi-tier network. The packets can be created by an agent executing on a host computer, such as the probing agent 120. In one embodiment, the probe packets can be TCP/IP packets where the IP source address is overloaded with a value representing a probing function. Each probe packet can include a destination address associated with a router on an edge of the multi-tier network, such that the destination addresses of the group of probe packets can cover all or a portion of the address range associated with the edge tier of the multi-tier network. Each probe packet can include a source port, and the source ports for the group of probe packets can be varied so that multiple probe packets addressed to the same router can take different intermediate paths. By varying the destination addresses and source ports for the group of packets over an appropriate distribution, potentially all of the network paths within the multi-tier network can be traversed by the group of probe packets.

At 320, the group of probe packets can be transmitted from the host computer and into the multi-tier network. For example, the group of probe packets can be sent repeatedly at a predetermined time period, such as at thirty second intervals. Alternatively, the group of probe packets can be sent in response to a message from the collector agent 130 indicating that the counter values have been received from the routers of the multi-tier network. For example, the probing agent 120 and the collector agent 130 can coordinate their functions so that the collector agent 130 can query the devices of the multi-tier network when the counters are in a steady-state condition, e.g., all of the packet probes have traversed the multi-tier network. After the counter values are received by the collector agent 130, the group of probe packets are ready to be transmitted again.

At 330, a number of probe packets at each router of the multi-tier network can be counted. For example, one or more ACL rules can be defined on each router to match packets having a source address that corresponds to one or more probing functions. Each ACL rule can be associated with a counter that triggers when a packet matches the ACL rule. Each ACL rule can include other matching criteria, such as an ingress port, an egress port, receiving a packet, transmitting a packet, or dropping a packet, for example. As one example, a first source address can be associated with packets transmitted through the multi-tier network in a first direction and a second source address can be associated with packets transmitted through the multi-tier network in a second direction. Thus, packets from a first data center to a second data center can use the first source address and packets from the second data center to the first data center can use the second source address so that unidirectional grey failures can potentially be detected. As another example, different source addresses can be associated with different respective ingress or egress ports of a router. Thus, an ACL rule can be programmed to count packets received by or transmitted from each ingress/egress port of the router. By counting packets on a per interface or port basis, it can potentially make it easier to triangulate a failing link or node of the multi-tier network.

At 340, the counts from each router of the multi-tier network can be received. For example, one or more collector agents can query the routers for the counts, using a SNMP query or a custom API. As another example, the routers can periodically transmit their counts to the collector agents based on a timing reference or other criteria. Receiving the counts can be distributed among different collector agents. For example, a first collector agent can receive the counts from a first group of tiers and a second collector agent can receive the counts from a second overlapping or non-overlapping group of tiers. For example, a first collector agent can receive the counts from tiers T1, T2, and T3 and a second collector agent can receive the counts from tiers T3, T4, and T5.

Receiving the counts from each router of the multi-tier network can be coordinated with transmitting the probe packets so that the counters are in a steady-state condition when the counts are received. For example, the counts can be collected after the probe packets have been transmitted by the probing agent 120, traversed the network, and been dropped at the network edge. Thus, the one or more collector agents can wait for the group of probe packets to traverse the multi-tier network. Coordination between the probing agent 120 and the one or more collector agents can occur based on a predefined time interval or other signaling event. For example, a packet indicating that the probe packets have been sent can be queued behind the probe packets and sent to the collector agent. Factors affecting the predefined time interval can include at least the number of probe packets transmitted, the line rate of the network links, the number of tiers in the network, and the average or minimum latency of the routers of the network. After the counts from each router are received, the counters can be cleared. Alternatively, the counter values received from each router can be saved, and the packet counts can be determined by subtracting the received counter values from the saved counter values of each router.

At 350, one or more performance metrics of the multi-tier network can be determined. The performance metrics can be based, at least in part, on the counter values received from the routers of the multi-tier network. For example, the packet counts (e.g., the counter values or the received counter values minus the saved counter values) for the routers of each tier can be summed. The number of packets counted at a tier can be compared to the number of packets counted at a neighboring tier. If the packet counts for each tier are the same, then the tiers are healthy. However, if the packet counts for each tier differ, then packets are being lost between the tiers and one or more network links and/or devices of the tiers can be degraded. The degraded components can potentially be diagnosed by analyzing the packet counts of each router.

For example, a group of 10,000 probe packets can be sent periodically, such as every 30 seconds, from the probing agent 120 into a Clos network including layers T1 and T2. The destination addresses and source ports of each packet within the group of 10,000 probe packets can be selected so that there is a high rate of packets through the core layer, and an even spread of these packets across the available ECMP routes between the T1 and T2 layers. After each group of 10,000 probe packets are sent, each layer of the Clos network should show a change or delta of 10,000 in the sum of all the counters. The collector agent 130 can poll each Clos device every 30 seconds to gather data on the counters. If all of the layers show matching counter delta values, then there is no packet loss and the Clos network is healthy. However, if the total counter delta in all the Clos T1 devices is 10,000, but the total counter delta in all of the Clos T2 devices is 9,000, then this indicates packets are being dropped between the T1 and T2 layers. Delta values for each device can be examined to determine which T2 device is affected. For example, if there are 32 devices in the T2 layer (2 Bricks×16 Tier 1's in each brick), the counter delta's may be [312, 310, 313, 316, 276, 310, . . . ]. The device with a delta of 276 can be identified as the impacted device since its counter delta is noticeably less than the counter deltas of the other devices. Programmatically, the impacted device can be identified as a device associated with a counter delta that differs from the mean counter delta for the devices of the layer by more than a predefined threshold amount.

The degraded components can potentially be diagnosed further when an ACL rule is used to match and count packets transmitted from and/or received by each interface of the router. For example, the source address (e.g., the probing function) of the packet can correspond to an egress or ingress port of the router. The counters associated with all of the ports of the router can be summed to get the total packets transmitted from and/or received by the router. If the number of packets to/from the router differ from an expected value, the number of packets to/from each port of the router can be compared to an expected value to determine if a link or node attached to the port is degraded. For example, if the packet count associated with ingress port 4 is less than expected, the link or node connected to port 4 may be degraded.

Figure 4:
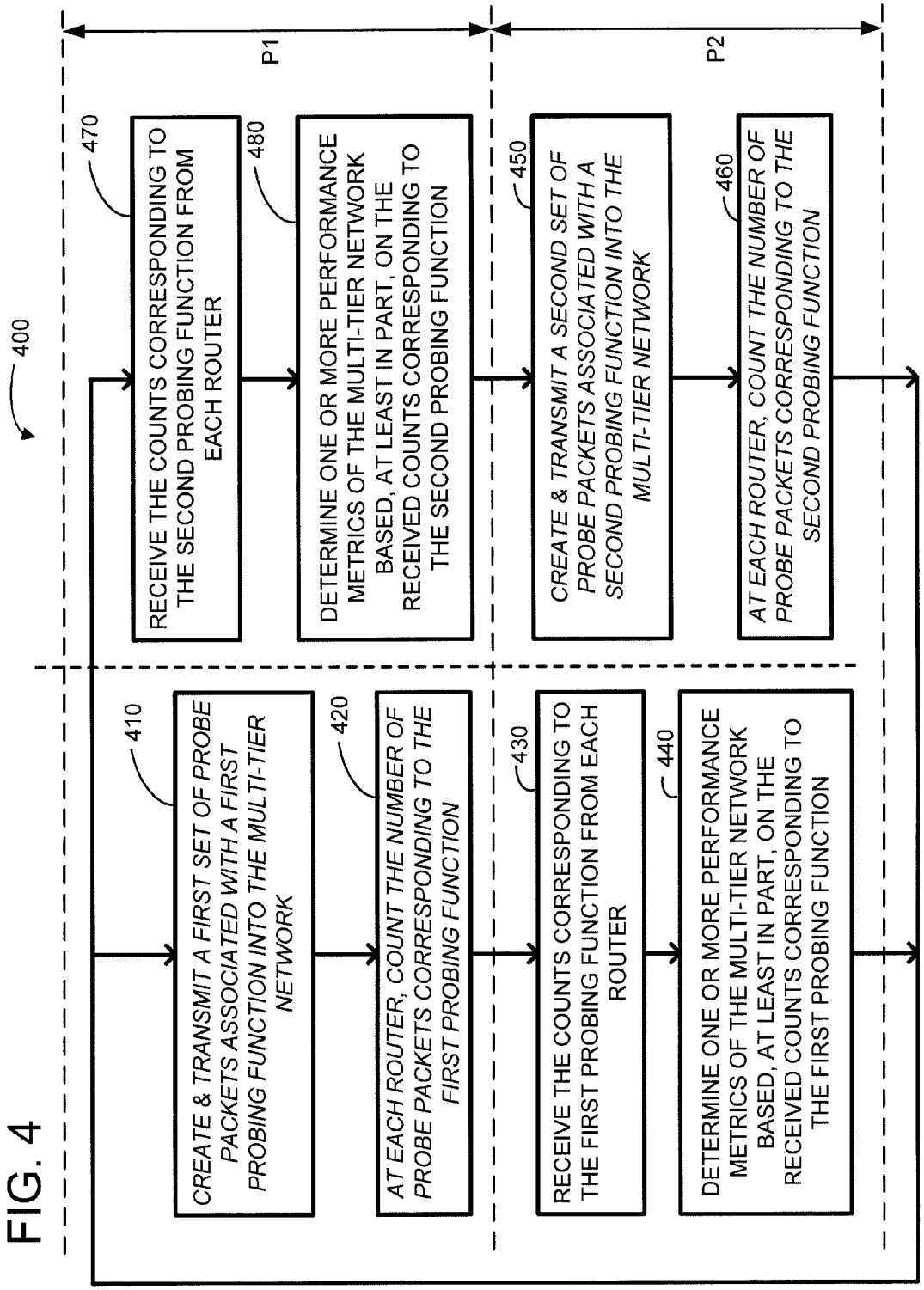

FIG. 4 shows a flow diagram of an example method 400 for monitoring a multi-tier interconnection network, such as the multi-tier networks 110 or 200. Method 400 can use two different probing functions to provide a more continuous monitoring of the multi-tier network than a single probing function alone. Method 400 is divided into two distinct time periods, P1 and P2. Steps 410, 420, 470, and 480 are completed during time period P1 and steps 430, 440, 450, and 460 are completed during time period P2. Steps 410 and 420 can perform the same functions as steps 450 and 460, respectively, except that steps 410 and 420 perform the functions for a first probing function and steps 450 and 460 perform the functions for a second probing function. Similarly, steps 430 and 440 can perform the same functions as steps 470 and 480, respectively, except that steps 430 and 440 perform the functions for a first probing function and steps 470 and 480 perform the functions for a second probing function.

At 410, a first set of probe packets corresponding to a first probing function are created and transmitted into the multi-tier network, such as by one or more probing agents 120. The probe packets can be identified by overloading the source address field with an identifier corresponding to the first probing function. For ease of explanation, the probe packets corresponding to the first probing function will be referred to as "blue packets." The number of blue packets, and the destination addresses and source ports of each blue packet are selected so that substantially all of the network paths within the multi-tier network can be traversed by the group of blue packets.

At 420, each router of the multi-tier network counts the number of probe packets corresponding to the first probing function (e.g., the blue packets) as they traverse the multi-tier network. For example, each router can include a counter that is triggered by an ACL rule that is defined to match the blue packets. The blue packets can be counted as they are received by and/or transmitted from the router. An edge router can count the blue packets that are dropped.

The transmission (410) and counting (420) of the blue packets can occur during the first time period P1. When all of the blue packets have traversed the multi-tier network (e.g., the counters of each router are in steady-state), the next time period, P2, can begin.

At 430, the counts corresponding to the first probing function (e.g., the blue counts) can be received from each router of the multi-tier network. For example, one or more collector agents 130 can query the routers to get the blue counts. At 440, the blue counts can be used to determine one or more performance metrics of the multi-tier network. For example, the blue counts can be used to determine if a tier or any of its components are degraded.

Also during time period P2, at 450, a second set of probe packets corresponding to a second probing function are created and transmitted into the multi-tier network, such as by one or more probing agents 120. For ease of explanation, the probe packets corresponding to the second probing function will be referred to as "green packets." The green packets can be substantially the same as the blue packets, except the green packets can be identified by overloading the source address field with an identifier corresponding to the second probing function, so as to distinguish them from the blue packets.

At 460, each router of the multi-tier network counts the number of probe packets corresponding to the second probing function (e.g., the green packets) as they traverse the multi-tier network. For example, each router can include a counter that is triggered by an ACL rule that is defined to match the green packets. Thus, each router can include two different counters and ACL rules, one for counting the green packets and one for counting the blue packets.

By using two different probing functions to monitor the multi-tier network, the transmission and counting of probe packets can be parallelized or pipelined with the collection and analysis of the probe packets. Specifically, the transmission (410) and counting (420) of the blue packets can be parallelized with the collection (470) and analysis (480) of the green packets during time period P1; and the transmission (450) and counting (460) of the green packets can be parallelized with the collection (430) and analysis (440) of the blue packets during time period P2. While FIG. 4 uses two probing functions to pipeline the monitoring of the multi-tier network, it should be understood that more than two probing functions can be used to further pipeline monitoring of the multi-tier network. Using pipelining, the multi-tier network can be monitored more continuously and problematic components can potentially be diagnosed more promptly.

Figure 5:
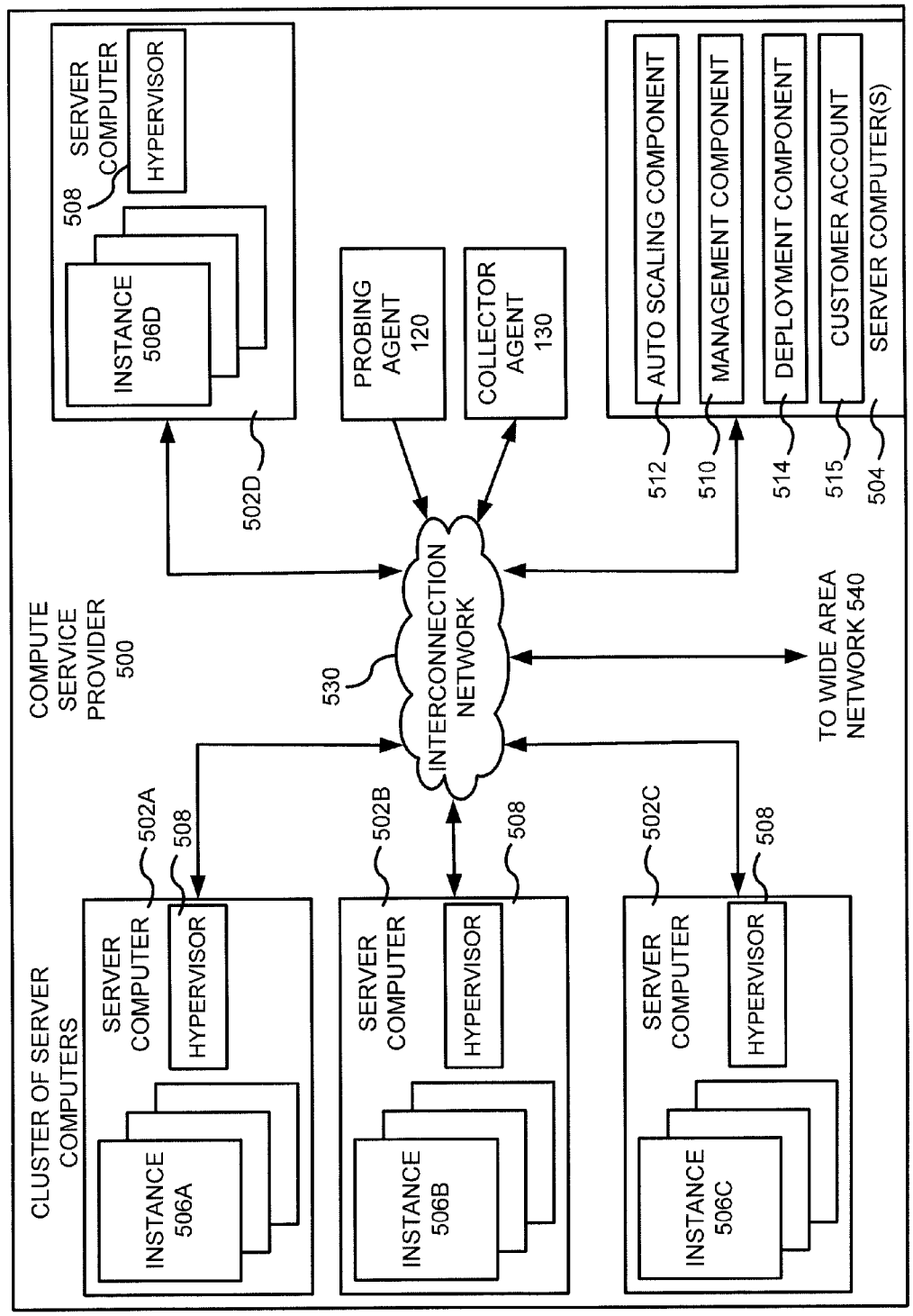
FIG. 5 is an example system diagram showing a plurality of virtual machine instances running in a multi-tenant environment.

FIG. 5 is a computing system diagram of a network-based compute service provider 500 that illustrates one environment in which embodiments described herein can be used. By way of background, the compute service provider 500 (i.e., the cloud provider) is capable of delivery of computing and storage capacity as a service to a community of end recipients. In an example embodiment, the compute service provider can be established for an organization by or on behalf of the organization. That is, the compute service provider 500 may offer a "private cloud environment." In another embodiment, the compute service provider 500 supports a multi-tenant environment, wherein a plurality of customers operate independently (i.e., a public cloud environment). Generally speaking, the compute service provider 500 can provide the following models: Infrastructure as a Service ("IaaS"), Platform as a Service ("PaaS"), and/or Software as a Service ("SaaS"). Other models can be provided. For the IaaS model, the compute service provider 500 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the compute service provider platform without the cost of buying and managing the underlying hardware and software. The SaaS model allows installation and operation of application software in the compute service provider. In some embodiments, end users access the compute service provider 500 using networked client devices, such as desktop computers, laptops, tablets, smartphones, etc. running web browsers or other lightweight client applications. Those skilled in the art will recognize that the compute service provider 500 can be described as a "cloud" environment.

The particular illustrated compute service provider 500 includes a plurality of server computers 502A-502D. While only four server computers are shown, any number can be used, and large centers can include thousands of server computers. The server computers 502A-502D can provide computing resources for executing software instances 506A-506D. In one embodiment, the instances 506A-506D are virtual machines. As known in the art, a virtual machine is an instance of a software implementation of a machine (i.e. a computer) that executes applications like a physical machine. In the example of virtual machine, each of the servers 502A-502D can be configured to execute a hypervisor 508 or another type of program configured to enable the execution of multiple instances 506 on a single server. Additionally, each of the instances 506 can be configured to execute one or more applications.

It should be appreciated that although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

One or more server computers 504 can be reserved for executing software components for managing the operation of the server computers 502 and the instances 506. For example, the server computer 504 can execute a management component 510. A customer can access the management component 510 to configure various aspects of the operation of the instances 506 purchased by the customer. For example, the customer can purchase, rent or lease instances and make changes to the configuration of the instances. The customer can also specify settings regarding how the purchased instances are to be scaled in response to demand. The management component can further include a policy document to implement customer policies. An auto scaling component 512 can scale the instances 506 based upon rules defined by the customer. In one embodiment, the auto scaling component 512 allows a customer to specify scale-up rules for use in determining when new instances should be instantiated and scale-down rules for use in determining when existing instances should be terminated. The auto scaling component 512 can consist of a number of subcomponents executing on different server computers 502 or other computing devices. The auto scaling component 512 can monitor available computing resources over an internal management network and modify resources available based on need.

A deployment component 514 can be used to assist customers in the deployment of new instances 506 of computing resources. The deployment component can have access to account information associated with the instances, such as who is the owner of the account, credit card information, country of the owner, etc. The deployment component 514 can receive a configuration from a customer that includes data describing how new instances 506 should be configured. For example, the configuration can specify one or more applications to be installed in new instances 506, provide scripts and/or other types of code to be executed for configuring new instances 506, provide cache logic specifying how an application cache should be prepared, and other types of information. The deployment component 514 can utilize the customer-provided configuration and cache logic to configure, prime, and launch new instances 506. The configuration, cache logic, and other information may be specified by a customer using the management component 510 or by providing this information directly to the deployment component 514. The instance manager can be considered part of the deployment component.

Customer account information 515 can include any desired information associated with a customer of the multi-tenant environment. For example, the customer account information can include a unique identifier for a customer, a customer address, billing information, licensing information, customization parameters for launching instances, scheduling information, auto-scaling parameters, previous IP addresses used to access the account, etc.

An interconnection network 530 can be utilized to interconnect the server computers 502A-502D and the server computer(s) 504. The interconnection network 530 can include a multi-tier interconnection network, such as a Clos, folded-Clos, fat-tree, butterfly, flattened-butterfly, or dragonfly network, for example. The server computers 502A-502D and the server computer(s) 504 can be connected to externally facing ports of the interconnection network 530. A Wide Area Network (WAN) 540 can be connected to externally facing ports of the interconnection network 530 so that end users can access the compute service provider 500. It should be appreciated that the network topology illustrated in FIG. 5 has been simplified and that many more networks and networking devices can be utilized to interconnect the various computing systems of the service provider 500.

A probing agent 120 and a collector agent 130 can be connected to the interconnection network 530 and used to monitor the interconnection network 530 as described herein. The probing agent 120 and the collector agent 130 can be running on the same host computer or different host computers. In one embodiment, the probing agent 120 and/or the collector agent 130 can be executing on the server computer(s) 504. The probing agent 120 and/or the collector agent 130 can communicate with the server computer(s) 504 and/or the server computers 502A-502D. For example, the server computer(s) 504 and/or the server computers 502A-502D can be used to configure and/or coordinate the functions of the probing agent 120 and the collector agent 130. The server computer(s) 504 and/or the server computers 502A-502D can be used to retrieve health data about the interconnection network 530 from the collector agent 130. The probing agent 120 and/or the collector agent 130 can operate as a web service that is accessible to the server computer(s) 504 and/or the server computers 502A-502D. Web services are commonly used in cloud computing. A web service is a software function provided at a network address over the web or the cloud. Clients initiate web service requests to servers and servers process the requests and return appropriate responses. The client web service requests are typically initiated using, for example, an API request. For purposes of simplicity, web service requests will be generally described below as API requests, but it is understood that other web service requests can be made. An API request is a programmatic interface to a defined request-response message system, typically expressed in JSON or XML, which is exposed via the web—most commonly by means of an HTTP-based web server. Thus, in certain implementations, an API can be defined as a set of Hypertext Transfer Protocol (HTTP) request messages, along with a definition of the structure of response messages, which can be in an Extensible Markup Language (XML) or JavaScript Object Notation (JSON) format. The API can specify a set of functions or routines that perform an action, which includes accomplishing a specific task or allowing interaction with a software component. When a web service receives the API request from a client device, the web service can generate a response to the request and send the response to the endpoint identified in the request.

Figure 6:
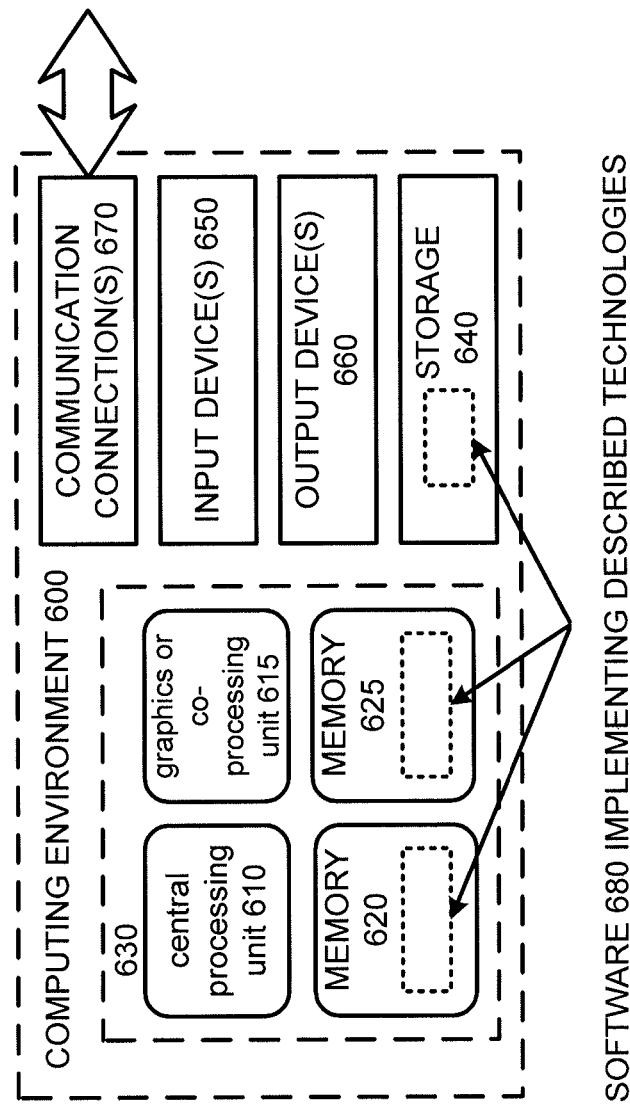
FIG. 6 depicts a generalized example of a suitable computing environment in which the described innovations may be implemented.

FIG. 6 depicts a generalized example of a suitable computing environment 600 in which the described innovations may be implemented. The computing environment 600 is not intended to suggest any limitation as to scope of use or functionality, as the innovations may be implemented in diverse general-purpose or special-purpose computing systems. For example, the computing environment 600 can be any of a variety of computing devices (e.g., desktop computer, laptop computer, server computer, tablet computer, etc.)

With reference to FIG. 6, the computing environment 600 includes one or more processing units 610, 615 and memory 620, 625. In FIG. 6, this basic configuration 630 is included within a dashed line. The processing units 610, 615 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 6 shows a central processing unit 610 as well as a graphics processing unit or co-processing unit 615. The tangible memory 620, 625 may be volatile memory (e.g., registers, cache, RAM), non-volatile memory (e.g., ROM, EEPROM, flash memory, etc.), or some combination of the two, accessible by the processing unit(s). The memory 620, 625 stores software 680 implementing one or more innovations described herein, in the form of computer-executable instructions suitable for execution by the processing unit(s).

A computing system may have additional features. For example, the computing environment 600 includes storage 640, one or more input devices 650, one or more output devices 660, and one or more communication connections 670. An interconnection mechanism (not shown) such as a bus, controller, or network interconnects the components of the computing environment 600. Typically, operating system software (not shown) provides an operating environment for other software executing in the computing environment 600, and coordinates activities of the components of the computing environment 600.

The tangible storage 640 may be removable or non-removable, and includes magnetic disks, magnetic tapes or cassettes, CD-ROMs, DVDs, or any other medium which can be used to store information in a non-transitory way and which can be accessed within the computing environment 600. The storage 640 stores instructions for the software 680 implementing one or more innovations described herein.

The input device(s) 650 may be a touch input device such as a keyboard, mouse, pen, or trackball, a voice input device, a scanning device, or another device that provides input to the computing environment 600. The output device(s) 660 may be a display, printer, speaker, CD-writer, or another device that provides output from the computing environment 600.

The communication connection(s) 670 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims.

What is claimed is:

1. A system for routing network traffic, the system comprising:
 a multi-tier network including a first tier of routers connected to a second tier of routers, the multi-tier network including multiple paths between the first tier of routers and the second tier of routers, the first tier of routers and the second tier of routers being neighboring tiers, each of the routers of the first and second tiers including:
  load balancing logic configured to spread packets across the multiple paths to routers of the neighboring tier;
  an access control list (ACL) rule for matching probe packets having a source address field within a predetermined range; and
  a counter triggered on the ACL rule being matched;

a first processor executing probing agent software configured to transmit a probe packet including a destination address served by multiple paths from the first tier of routers to the second tier of routers and a source address field having a false source address identifying the packet as a probe packet, the false source address being within the predetermined range; and a second processor executing collector agent software connected to the multi-tier network and configured to:
receive a value of the counter of each router of the first and second tiers of the multi-tier network, the value of the counter corresponding to a number of probe packets counted at each router, and
determine one or more performance metrics of a particular path through the multi-tier network based, at least in part, on a sum of the number of probe packets counted at respective routers of the first tier of routers and a sum of the number of probe packets counted at respective routers of the second tier of routers.

2. The system of claim 1, wherein the second processor is further configured to determine that the first tier of routers is degraded if the number of probe packets received at the second tier of routers is less than the number of probe packets received at the first tier of routers.

3. The system of claim 1, wherein the multi-tier network is a multi-tier Clos network fabric using equal cost multipath (ECMP) routing between the first tier of routers and the second tier of routers, and determining the one or more performance metrics of the particular path through the multi-tier network includes determining that a first router of the first tier of routers is degraded when the number of probe packets counted at the first router differs by more than a predetermined threshold from the number of probe packets counted at each of the other routers of the first tier of routers.

4. The system of claim 1, wherein each router of the first tier of routers and each router of the second tier of routers includes a ternary content addressable memory (TCAM) for storing an ACL table.

5. The system of claim 1, wherein the transmitted probe packet includes a time-to-live field with a value less than or equal to a number of tiers of the multi-tier network.

6. The system of claim 1, wherein the destination address of the probe packet corresponds to an unused address within a subnet of an edge router of the multi-tier network.

7. The system of claim 1, wherein the multi-tier network comprises an edge tier, and each router of the edge tier includes an ACL rule for dropping probe packets having a source address field within the predetermined range.

8. A method of monitoring a multi-tier network including a first tier of routers and a second tier of routers, the method comprising:
creating, by a host computer, a probe packet comprising:
a source address field having a value corresponding to a forged source address identifying the packet as a probe packet, and
a destination address served by a path from the first tier of routers to the second tier of routers;
transmitting the probe packet from the host computer and into the multi-tier network, wherein the multi-tier network comprises multiple paths between the first tier of routers and the second tier of routers, respective routers of the first tier of routers and the second tier of routers configured to spread packets across the multiple paths between the first tier of routers and the second tier of routers;
receiving a number of probe packets counted by each router of the first tier of routers and each router of the second tier of routers; and
determining one or more performance metrics of a particular tier of the multi-tier network based, at least in part, on a difference between a sum of the number of probe packets counted by the routers of the first tier of routers and a sum of the number of probe packets counted by the routers of the second tier of routers.

9. The method of claim 8, wherein the source address field is within a predetermined range that matches an access control list (ACL) rule of each router of the first tier of routers and each router of the second tier of routers.

10. The method of claim 8, wherein the source address field of the probe packet is within a first predetermined range when the probe packet is transmitted during a first time period, and the source address field of the probe packet is within a second predetermined range when the probe packet is transmitted during a second time period.

11. The method of claim 8, wherein determining the one or more performance metrics of the particular tier of the multi-tier network includes determining that the first tier of routers is degraded when the number of probe packets received at the second tier of routers is less than the number of probe packets received at the first tier of routers.

12. The method of claim 8, wherein the multi-tier network uses equal cost multipath (ECMP) routing between the first tier of routers and the second tier of routers, and determining the one or more performance metrics of the particular tier of the multi-tier network includes determining that a first router of the first tier of routers is degraded when the number of probe packets counted at the first router differs from the number of probe packets counted at each of the other routers of the first tier of routers by more than a predetermined threshold.

13. The method of claim 8, wherein the transmitted probe packet includes a time-to-live field with a value that prevents the probe packet from reaching the destination address.

14. The method of claim 8, wherein the destination address of the probe packet corresponds to an unused address within a subnet of an edge router of the multi-tier network.

15. A computer-readable storage medium including instructions thereon for executing a method of monitoring a multi-tier network including a first tier of routers and a second tier of routers, the method comprising:
creating a group of probe packets, each probe packet comprising:
a source address field having a value representing a false source address and identifying the packet as a probe packet, the value different than a network address of a source node of the probe packet, and
a destination address corresponding to an address reachable by a router of an edge tier of the multi-tier network;
transmitting the group of probe packets into the multi-tier network, wherein the multi-tier network comprises multiple paths between the first tier of routers and the second tier of routers, respective routers of the first tier of routers and the second tier of routers configured to spread packets across the multiple paths between the first tier of routers and the second tier of routers;
waiting for the group of probe packets to traverse the multi-tier network and get dropped at the edge of the multi-tier network and then querying each router of the first tier of routers and each router of the second tier of routers for a number of probe packets counted by each router; and determining one or more performance metrics of a particular tier of the multi-tier network based, at least in part, on a difference between a sum of the number of probe packets counted by the routers of the first tier of routers and a sum of the number of probe packets counted by the routers of the second tier of routers.

16. The computer-readable storage medium of claim 15, wherein each probe packet of the group of probe packets includes a different source port.

17. The computer-readable storage medium of claim 15, wherein the source address field of each probe packet corresponds to a port of a router of the first or second tier of routers, and querying for the number of probe packets includes querying for the number of probe packets associated with each port of the router.

18. The computer-readable storage medium of claim 15, wherein the multi-tier network uses equal cost multipath (ECMP) routing between the first tier of routers and the second tier of routers, and determining the one or more performance metrics of the particular tier of the multi-tier network includes determining that a first router of the first tier of routers is degraded when the number of probe packets counted at the first router differs from the number of probe packets counted at each of the other routers of the first tier of routers by more than a predetermined threshold.

19. The computer-readable storage medium of claim 15, wherein the source address field of the probe packet is within a first predetermined range when the probe packet is transmitted during a first time period, and the source address field of the probe packet is within a second predetermined range when the probe packet is transmitted during a second time period.

20. The computer-readable storage medium of claim 15, wherein each transmitted probe packet of the group of probe packets includes a time-to-live field with a value that prevents the probe packet from reaching the destination address.

* * * * *